US009493637B2

(12) United States Patent
Maejima et al.

(10) Patent No.: US 9,493,637 B2
(45) Date of Patent: Nov. 15, 2016

(54) TIRE RUBBER COMPOSITION AND STUDLESS TIRE

(75) Inventors: Keisuke Maejima, Kanagawa (JP); Kazushi Kimura, Kanagawa (JP); Satoshi Mihara, Kanagawa (JP); Yayoi Akahori, Kanagawa (JP); Katsunori Shimizu, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 273 days.

(21) Appl. No.: 14/112,739

(22) PCT Filed: Apr. 20, 2012

(86) PCT No.: PCT/JP2012/060733
§ 371 (c)(1),
(2), (4) Date: Dec. 27, 2013

(87) PCT Pub. No.: WO2012/144605
PCT Pub. Date: Oct. 26, 2012

(65) Prior Publication Data
US 2014/0100321 A1    Apr. 10, 2014

(30) Foreign Application Priority Data

Apr. 22, 2011 (JP) ................ 2011-095939

(51) Int. Cl.
| C08L 7/00 | (2006.01) |
| C08L 9/00 | (2006.01) |
| C08C 19/34 | (2006.01) |
| C08L 21/00 | (2006.01) |
| C08K 3/04 | (2006.01) |
| C08K 3/00 | (2006.01) |

(52) U.S. Cl.
CPC .............. C08L 9/00 (2013.01); C08C 19/34 (2013.01); C08L 7/00 (2013.01); C08L 21/00 (2013.01); *C08K 3/0033* (2013.01); *C08K 3/04* (2013.01); *C08K 2201/003* (2013.01)

(58) Field of Classification Search
CPC ............ C08L 7/00; C08L 9/00; C08L 15/00; C08L 21/00
USPC ........................ 524/552, 506, 526
See application file for complete search history.

(56) References Cited

U.S. PATENT DOCUMENTS

| 6,908,965 | B2 | 6/2005 | Obrecht et al. | |
| 8,450,396 | B2 | 5/2013 | Tsou et al. | |
| 2002/0123564 | A1 | 9/2002 | Obrecht et al. | |
| 2002/0161119 | A1 | 10/2002 | Obrecht et al. | |
| 2002/0177661 | A1* | 11/2002 | Obrecht ............. | C08G 18/3215 525/125 |
| 2008/0169053 | A1 | 7/2008 | Nakamura | |
| 2010/0144954 | A1 | 6/2010 | Kikuchi et al. | |

FOREIGN PATENT DOCUMENTS

| DE | 100 39 749 A1 | 2/2002 |
| DE | 100 52 287 A1 | 4/2002 |
| DE | 10 2008 003 175 A1 | 7/2008 |
| JP | 04-123906 A | 4/1992 |
| JP | 2003-306580 A | 10/2003 |
| JP | 2004-515620 A | 5/2004 |
| JP | 2009-051942 A | 3/2009 |
| JP | 2011-500883 A | 1/2011 |

OTHER PUBLICATIONS

Loadman, "The Glass Transition of Natural Rubber", Journal of Thermal Analysis, 929-941 (1985).*
Office Action dated Jan. 27, 2015 issued to the corresponding Russian Patent Application 2013152024 and a partial English translation thereof.
Office Action issued to the corresponding German Patent Application No. 11 2012 001 8354 and its partial English translation.

* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

An object of the present invention is to provide a tire rubber composition capable of producing a studless tire that has excellent performance on ice and wear resistance, and to provide a studless tire using the composition. The tire rubber composition of the present invention is composed of 100 parts by mass of a diene type rubber (A), from 30 to 100 parts by mass of a carbon black and/or a white filler (B), from 0.3 to 30 parts by mass of a cross-linkable oligomer or polymer (C) that is not phase-soluble with the diene type rubber (A); and from 0.1 to 12 parts by mass of three dimensionally crosslinked fine particles (D) of 1 to 200 μm average particle diameter.

8 Claims, 1 Drawing Sheet

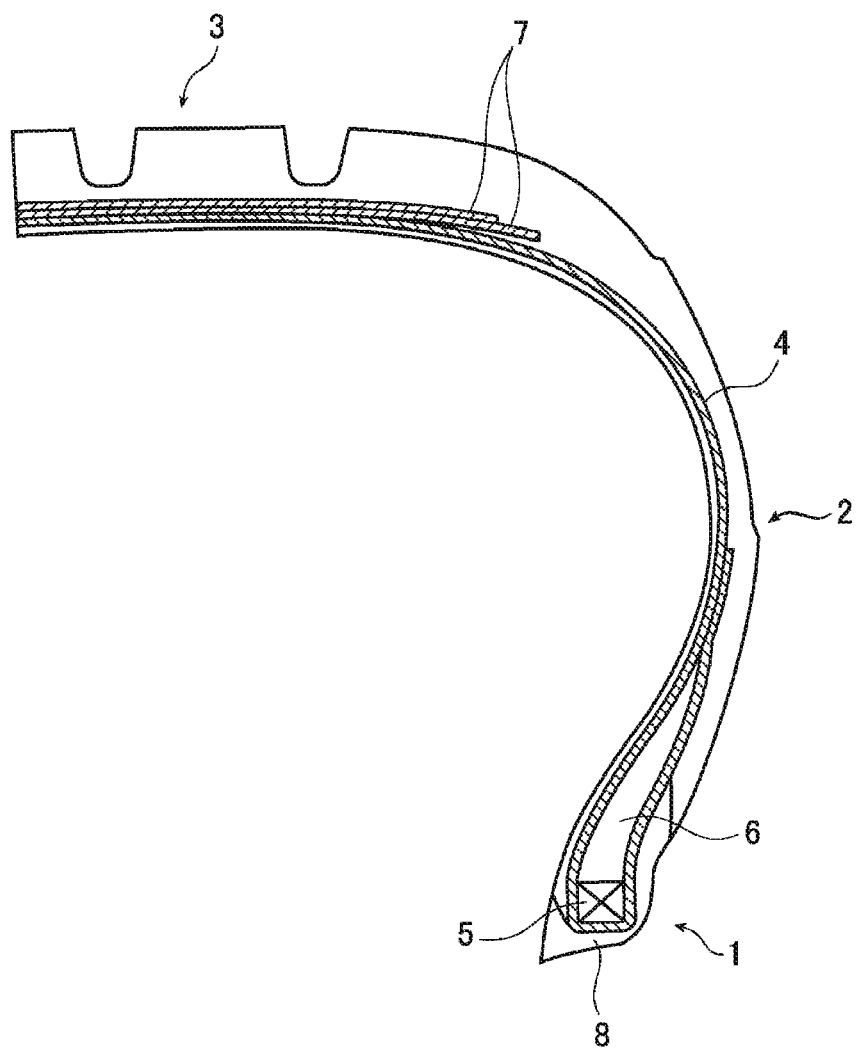

TIRE RUBBER COMPOSITION AND STUDLESS TIRE

TECHNICAL FIELD

The present invention relates to a tire rubber composition and a studless tire.

BACKGROUND OF THE INVENTION

Tire rubber compositions have been previously developed that are capable of roughening of the tread surface and improving affinity with ice with the object of improvement of friction of a studless tire on ice.

For example, Patent Document 1 contains mention of a tire tread rubber composition composed of, relative to 100 parts by mass of a rubber component composed of diene type rubber, greater than or equal to 10 parts by mass and less than or equal to 50 parts per weight of a polymer gel (i.e. cross-linked rubber particles of 40 to 200 nm average particle diameter), and greater than or equal to 20 parts by mass and less than or equal to 40 parts by mass of a powder of 10 to 500 .mu.m average particle diameter composed of a plant porous carbide ([Claim 1]). Moreover, in addition to blending a large amount of the powder composed of the plant porous carbide, the polymer gel (i.e. the cross-linked rubber particles) is used. Thus while realizing the maximum moisture absorption effect due to the porous carbide powder, it is possible to sufficiently maintain road contact surface area, and knowledge is mentioned of the obtaining of a motion performance improvement effect at low temperature, i.e. performance on ice and performance on snow.

PRIOR ART DOCUMENTS

Patent Documents

Patent Document 1: Japanese Unexamined Patent Application Publication No. 2009-051942

SUMMARY OF THE INVENTION

Problems to be Solved by the Invention

However, when the inventors of the present invention repeatedly investigated the rubber composition mentioned in Patent Document 1, the effect of improvement of performance on ice was insufficient, and it became clear that there were problems such as worsening of wear resistance or the like.

Thus the object of the present invention is to provide a tire rubber composition capable of producing a studless tire for which both performance on ice and wear resistance are excellent, and to provide a studless tire using such a composition.

Means to Solve the Problem

As a result of dedicated investigations in order to accomplish the aforementioned objects, the inventors of the present invention discovered the ability to produce a studless tire for which both performance on ice and wear resistance were excellent, by blending of fine particles of a specific particle diameter together with a certain cross-linkable oligomer or polymer.

Specifically, the present invention provides the following (1) to (13).

(1) A tire rubber composition including: 100 parts by mass of a diene type rubber (A);
from 30 to 100 parts by mass of a carbon black and/or a white filler (B);
from 0.3 to 30 parts by mass of a cross-linkable oligomer or polymer (C) that is not phase-soluble with the diene type rubber (A);
and from 0.1 to 12 parts by mass of three dimensionally crosslinked fine particles (D) of 1 to 200 μm average particle diameter.

(2) The tire rubber composition of the aforementioned (1); wherein the fine particles (D) are fine particles produced beforehand, in the cross-linkable oligomer or polymer (C), by three dimensional crosslinking of an oligomer or polymer (d1) that is not phase-soluble with the cross-linkable oligomer or polymer (C).

(3) The tire rubber composition of (1) or (2); wherein the diene type rubber (A) is composed of at least 30% by weight of at least one type of rubber selected from the group consisting of natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and derivatives of such rubbers.

(4) The tire rubber composition of any one of (1) to (3); wherein the cross-linkable oligomer or polymer (C) is selected from the group composed of polyether-based, polyester-based, polyolefin-based, polycarbonate-based, aliphatic-based, saturated hydrocarbon-based, acrylic-based, and plant derived polymers and copolymers.

(5) The tire rubber composition of any one of (2) to (4); wherein the oligomer or polymer (d1) is selected from the group composed of polycarbonate-based, aliphatic-based, saturated hydrocarbon-based, acrylic-based, and plant derived polymers and copolymers.

(6) The tire rubber composition of (4) or (5); wherein the cross-linkable oligomer or polymer (C) is selected from the group composed of polyether-based, polyester-based, polyolefin-based, polycarbonate-based, acrylic-based, and plant derived polymers and copolymers;
and the oligomer or polymer (d1) is selected from the group composed of aliphatic-based polymers and oligomers.

(7) The tire rubber composition of any one of (1) to (6); wherein the cross-linkable oligomer or polymer (C) has at least one or more reactable functional groups selected from the group composed of a hydroxyl group, a silane functional group, an isocyanate group, a (meth)acryloyl group, an allyl group, a carboxy group, an acid anhydride group, and an epoxy group.

(8) The tire rubber composition of (7); wherein the oligomer or polymer (d1) has at least one or more reactive functional group that is different from the reactive functional group of the cross-linkable oligomer or polymer (C), that is unreactive with the reactive functional group of the cross-linkable oligomer or polymer (C), and that is selected from the group composed of a hydroxyl group, a silane functional group, an isocyanate group, a (meth)acryloyl group, an allyl group, a carboxy group, an acid anhydride group, and an epoxy group;
and the fine particles (D) are fine particles three dimensionally crosslinked using the reactive functional group of the oligomer or polymer (d1) in the cross-linkable oligomer or polymer (C).

(9) The tire rubber composition of (8); wherein the fine particles (D) are fine particles three dimensionally crosslinked by reaction between the oligomer or polymer (d1) having the reactive functional group, and at least one component (d2) selected from the group composed of water, a catalyst, and a compound having a functional group reactive with the reactive functional group.

(10) The tire rubber composition of (9); wherein, among the components (d2), the compound having a functional group reactive with the reactive functional group is at least one compound selected from the group composed of hydroxyl group-containing compounds, silanol compounds, hydrosilane compounds, diisocyanate compounds, amine compounds, oxazolidine compounds, enamine compounds, and ketimine compounds.

(11) The tire rubber composition of any one of (1) to (10); wherein an average particle diameter of the fine particles (D) is 1 to 50 μm.

(12) The tire rubber composition of any one of (1) to (11); wherein an average glass transition temperature of the diene type rubber (A) is −50° C. or less.

(13) A studless tire comprising the tire rubber composition described in any one of the aforementioned (1) to (12) for the tire tread.

Effects of the Invention

As indicated hereinafter, according to the present invention, it is possible to provide a tire rubber composition capable of producing a studless tire for which both performance on ice and wear resistance are excellent, and to provide a studless tire using such composition.

BRIEF DESCRIPTION OF THE DRAWING

This is a schematic partial cross-sectional drawing of a tire showing an example of an embodiment of the studless tire of the present invention.

BEST MODE FOR CARRYING OUT THE INVENTION

[Rubber Composition for Use in Tires]

The tire rubber composition of the present invention is composed of 100 parts by mass of a diene type rubber (A), from 30 to 100 parts by mass of a carbon black and/or a white filler (B), from 0.3 to 20 parts by mass of a cross-linkable oligomer or polymer (C) that is not phase-soluble with the diene type rubber (A), and from 0.1 to 12 parts by mass of three dimensionally crosslinked fine particles (D) of 1 to 200 μm average particle diameter.

Each of the components of the tire rubber composition of the present invention will be explained below in detail.

<Diene Type Rubbers (A)>

No particular limitation is placed on the diene type rubber (A) included in the tire rubber composition of the present invention as long as there are double bonds in the main chain. Specific examples of the diene type rubber (A) include natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), or the like. A single type of diene type rubber or a combination or two or more diene rubbers may be used.

Moreover, the aforementioned diene type rubber (A) may be derivatives produced by modification by the terminals or side chains of each of the aforementioned rubbers by an amino group, amide group, silyl group, alkoxy group, carboxy group, hydroxy group, epoxy group, or the like.

In order to improve performance of the tire on ice, among such diene type rubbers, the use of NR, BR, and SBR is preferred, and the combined use of NR and BR is further preferred.

In the present invention, an average glass transition temperature of the aforementioned diene type rubber (A) is preferably less than or equal to −50° C. due to the ability to maintain low hardness even at low temperature and for further improvement of tire performance on ice.

Here, the glass transition temperature is the value determined at a temperature elevation speed of 10° C./min in accordance with ASTMD3418-82 using a differential scanning calorimeter (DSC) manufactured by DuPont.

The average glass transition temperature is the average value of the glass transition temperature, and when only one type of diene type rubber is used, refers to the glass transition temperature of that diene type rubber, while when a combination of two or more types of diene type rubbers is used, refers to the glass transition temperature of the entire diene type rubber (mixture of each diene type rubber) and can be calculated as the average value from the glass transition temperature of each diene type rubber and the compounding ratio of each diene type rubber.

Moreover, for improvement of tire strength in the present invention, preferably at least 20% by weight of the aforementioned diene type rubber (A) is NR, and further preferably at least 40% by weight is NR.

<A Carbon Black and/or White Filler (B)>

The tire rubber composition of the present invention includes a carbon black and/or a white filler (B).

(Carbon Black)

Specific examples of the carbon black are furnace carbon blacks such as SAF, ISAF, HAF, FEF, GPE, and SRF, and one of these can be used alone, or a combination of two or more can be used.

From standpoints such as proccessability during mixing of the rubber composition, reinforcement ability of the tire, or the like, a nitrogen adsorption specific surface area ($N_2SA$) of the aforementioned carbon black is preferably 10 to 300 $m^2/g$, and further preferably is 20 to 200 $m^2/g$. For improvement of wettability of the tire and for further improvement of performance on ice, the nitrogen adsorption specific surface area is preferably 50 to 150 $m^2/g$, and further preferably is 70 to 130 $m^2/g$.

Here, $N_2SA$ is the value of nitrogen adsorption on the surface of the carbon black as measured according to JIS K 6217-2:2001 "Part 2: Determination Of Specific Surface Area—Nitrogen Adsorption Methods—Single-point Procedures".

(White Filler)

Specific examples of the white filler are silica, calcium carbonate, magnesium carbonate, talc, clay, alumina, aluminum hydroxide, titanium oxide, and calcium sulfate. One of these can be used alone, or a combination of two or more can be used.

Among these examples, silica is preferred for further improvement of performance of the tire on ice.

Specific examples of the silica are wet silica (hydrous silicic acid), dry silica (silicic anhydride), calcium silicate, and aluminum silicate. One of these can be used alone, or a combination of two or more can be used.

Among these types of silica, wet silica is preferred for further improvement of performance of the tire on ice and further improvement of wear resistance.

For improvement of tire wettability and rolling resistance, a CTAB adsorption specific surface area of the aforementioned silica is preferably 50 to 300 m²/g, further preferably is 70 to 250 m²/g, and most preferably is 90 to 200 m²/g.

This CTAB adsorption specific surface area is the value of adsorption of n-hexadecyl trimethyl ammonium bromide on the silica surface according to JIS K 6217-3:2001 "Part 3: Determination of specific surface area—CTAB adsorption methods".

The content of the aforementioned a carbon black and/or a white filler (B) in the present invention, relative to 100 parts by mass of the aforementioned diene type rubber (A), is from 30 to 100 parts by mass of the total of the carbon black and white filler, preferably is from 40 to 90 parts by mass, and further preferably is from 45 to 80 parts by mass.

Moreover, if the aforementioned carbon black and the aforementioned white filler are used in combination, the content of the aforementioned white filler relative to 100 parts by mass of the aforementioned diene type rubber (A) is preferably from 5 to 85 parts by mass, and further preferably is from 15 to 75 parts by mass.

<Cross-linkable Oligomer or Polymer (C)>

The cross-linkable oligomer or polymer (C) included in the tire rubber composition of the present invention may be any oligomer or polymer that is cross-linkable and is not phase-soluble with the aforementioned diene type rubber (A).

Here, the expression "not phase-soluble (with the aforementioned diene type rubber)" does not mean phase-insolubility in all rubber components included in the aforementioned diene type rubber (A), but rather means that there is mutual phase-insolubility of each of the specific components used in the aforementioned diene type rubber (A) and used in the aforementioned cross-linkable oligomer or polymer.

Examples of the aforementioned cross-linkable oligomer or polymer (C) include polyether-based, polyester-based, polyolefin-based, polycarbonate-based, aliphatic-based, saturated hydrocarbon-based, acrylic-based, and plant derived polymers, copolymers, or the like.

Among these examples, polyether-based, polyester-based, polyolefin-based, polycarbonate-based, acrylic-based, and plant derived polymers and copolymers are preferred as the aforementioned cross-linkable oligomer or polymer (C) from the standpoint of suitability of use of an aliphatic-based polymer or copolymer (e.g. a liquid diene type polymer) as the below described oligomer or polymer (d1).

Here, the aforementioned polyether-based polymer or copolymer is exemplified by polyethylene glycol, polypropylene glycol (PPG), polypropylene triol, ethylene oxide-propylene oxide copolymer, polytetramethylene ether glycol (PTMEG), sorbitol-based polyol, or the like.

Moreover, the aforementioned polyester-based polymer or copolymer is exemplified by condensation products (condensed type polyester polyols) of lower polyhydric alcohols (such as ethylene glycol, diethylene glycol, propylene glycol, or the like) and polybasic carboxylic acids (such as adipic acid, sebacic acid, terephthalic acid, isophthalic acid, or the like); lactone based polyols; or the like.

Moreover, the aforementioned polyolefin-based polymer or copolymer is exemplified by polyethylene, polypropylene, ethylene-propylene copolymers (EPR, EPDM), polybutylene, polyisobutylene, hydrogenated polybutadiene, or the like.

Moreover, the aforementioned polycarbonate-based polymer or copolymer is exemplified by polycarbonate-based polymers or copolymers obtained by ester exchange reaction between polyol compounds (such as 1,6-hexanediol, 1,4-butanediol, 1,5-pentanediol, or the like) and dialkyl carbonates.

The aforementioned acrylic-based polymer or copolymer is exemplified by acrylic polyols; homopolymers of acrylates such as acrylate, methyl acrylate, ethyl acrylate, butyl acrylate, 2-ethylhexyl acrylate, or the like; acrylate copolymers combining two or more of such acrylates; or the like.

Furthermore, the aforementioned plant derived type of polymer or copolymer is exemplified by various types of elastomers derived from plant oils-fats such as castor oil, soybean oil, or the like; modified polyester polyols produced by modification of polylactic acid or the like; or the like.

Since the performance of the tire on ice is further improved by crosslinking between molecules of the aforementioned cross-linkable oligomer or polymer (C) in the present invention, the aforementioned cross-linkable oligomer or polymer (C) preferably has at least one or more reactive functional groups selected from the group composed of a hydroxyl group, a silane functional group, an isocyanate group, a (meth)acryloyl group, an allyl group, a carboxy group, an acid anhydride group, and an epoxy group.

Here, the aforementioned silane functional group is also called a cross-linkable silyl group. Specific examples of the silane functional group include hydrolyzable silyl groups; the silanol group; functional groups obtained by substitution of a silanol group by acetoxy group derivatives, enoxy group derivatives, oxime group derivatives, amine derivatives, or the like; or the like.

Among such functional groups, the aforementioned cross-linkable oligomer or polymer (C) preferably has a silane functional group, isocyanate group, acid anhydride group, or epoxy group in order to improve wear resistance, to improve performance of the tire on ice, and to suitably crosslink the aforementioned cross-linkable oligomer or polymer (C) during rubber processing. Among such example functional groups, hydrolyzable silyl groups and the isocyanate group are further preferred.

Specific examples of the aforementioned hydrolyzable silyl group include alkoxysilyl groups, alkenyloxysilyl groups, acyloxysilyl groups, aminosilyl groups, amino-oxysilyl groups, oxime silyl groups, amidosilyl groups, or the like.

Among these examples of hydrolyzable silyl groups, for good balance between hydrolyzation ability and storage stability, alkoxysilyl groups are preferred. Specifically, the alkoxysilyl groups indicated by the below listed formula (1) are further preferred, and methoxysilyl groups and ethoxysilyl groups are most preferred.

Formula 1

(1)

(In the formula, $R^1$ indicates an alkyl group having 1 to 4 carbon atoms; $R^2$ indicates a hydrogen atom or an alkyl group having 1 to 4 carbon atoms; and "a" indicates an integer ranging from 1 to 3. When "a" is 2 or 3, the multiple $R^1$ groups may be the same or different. When "a" is 1, the multiple $R^1$ groups may be the same or different.)

Moreover, the aforementioned isocyanate group is a residual isocyanate group remaining from reaction between a hydroxyl group of a polyol compound (an polycarbonate type polyol or the like, for example) and the isocyanate group of a polyisocyanate compound.

The aforementioned polyisocyanate compound may be any polyisocyanate compound that has at least two isocyanate groups within the molecule. The aforementioned polyisocyanate compound is exemplified by aromatic polyisocyanates such as TDI (such as 2,4-tolylene diisocyanate (2,4-TDI) and 2,6-tolylene diisocyanate (2,6-TDI)), MDI (such as 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), triphenylmethane triisocyanate, or the like; aliphatic polyisocyanates such as hexamethylene diisocyanate (HDI), trimethylhexamethylene diisocyanate (TMHDI), lysine diisocyanate, norbornane diisocyanate (NBDI), or the like; alicyclic polyisocyanates such as transcyclohexane-1,4-diisocyanate, isophorone diisocyanate (IPDI), bis(isocyanate methyl)cyclohexane ($H_6$XDI), dicyclohexylmethane diisocyanate ($H_{12}$MDI), or the like; carbodiimide-modified polyisocyanates of such polyisocyanate compounds; isocyanurate-modified polyisocyanates of such polyisocyanate compounds; or the like.

When the cross-linkable oligomer or polymer (C) having a hydroxyl group as the reactive functional group is used in the present invention, prior to blending in the aforementioned diene type rubber (A), part or all of the cross-linkable oligomer or polymer (C) is preferably crosslinked beforehand by use of an isocyanate compound or the like, or a crosslinking agent such as an isocyanate or the like is preferably blended beforehand in the rubber.

The aforementioned cross-linkable oligomer or polymer (C) preferably has the aforementioned reactive functional group at least at the terminus of the chain of the cross-linkable oligomer or polymer (C). If the main chain is a straight chain, the cross-linkable oligomer or polymer (C) preferably has at least 1.5 such reactive groups, and further preferably has at least 2 such reactive groups. On the other hand, if the main chain is branched, the cross-linkable oligomer or polymer (C) preferably has at least 3 such reactive groups.

The mass average molecular weight or number average molecular weight of the aforementioned cross-linkable oligomer or polymer (C) is preferably 300 to 30,000, and further preferably is 500 to 25,000, for improvement of dispersibility in the aforementioned diene type rubber (A), for improvement of kneading ability of the rubber composition, and for easy adjustment of particle diameter and shape during preparation of the below described fine particles (D) in the aforementioned cross-linkable oligomer or polymer (C).

Here, the mass average molecular weight and number average molecular weight are both measured by conversion to standard polystyrene using gel permeation chromatography (GPC).

Furthermore, the content of the aforementioned cross-linkable oligomer or polymer (C) in the present invention, relative to 100 parts by mass of the aforementioned diene type rubber (A), is from 0.3 to 30 parts by mass, preferably is from 0.5 to 25 parts by mass, and preferably is from 1 to 15 parts by mass.

<Fine Particles (D)>

The fine particles (D) contained in the tire rubber composition of the present invention are three dimensionally crosslinked fine particles having an average particle diameter of 1 to 200 μm.

The average particle diameter of the aforementioned fine particles (D) is preferably 1 to 50 μm, and further preferably is 5 to 40 μm, in order to obtain appropriate roughness for the surface of the tire, and to further improve performance on ice.

Here, the term "average particle diameter" refers to average value for the equivalent diameter circle measured using a laser microscope. For example, measurement is possible using a laser diffraction scattering type particle diameter distribution measurement apparatus LA-300 (manufactured by Horiba, Ltd.), laser microscope VK-8710 (manufactured by Keyence Corp.), or the like.

In the present invention, the content of the aforementioned fine particles (D) relative to 100 parts by mass of the aforementioned diene type rubber (A) is from 0.1 to 12 parts by mass, preferably is from 0.3 to 10 parts by mass, and further preferably is from 0.5 to 10 parts by mass.

By use of the aforementioned certain content of the fine particles (D), both the performance on ice and the wear resistance of the studless tire having a tire tread using the tire rubber composition of the present invention become good.

This is thought to be the distribution of locally applied distortion due to elasticity of the aforementioned fine particles (D) so that stress is alleviated, and performance on ice and wear resistance are improved.

Moreover, in order to further improve performance of the tire on ice and wear resistance, the aforementioned fine particles (D) are preferably three dimensionally crosslinked fine particles (crosslinked beforehand in the aforementioned cross-linkable oligomer or polymer (C)) of the oligomer or polymer (d1) that are not phase-soluble with the aforementioned cross-linkable oligomer or polymer (C) in the present invention. This is thought to be due to the aforementioned cross-linkable oligomer or polymer (C) functioning as a solvent for the aforementioned fine particles (D), and when this mixture is blended in the rubber composition, an effect may be anticipated of improvement of dispersibility and dispersion in the rubber composition of the aforementioned cross-linkable oligomer or polymer (C) and the aforementioned fine particles (D).

Here, the expression "not phase-soluble (with the aforementioned cross-linkable oligomer or polymer (C))" does not mean not phase-soluble with all components included in the aforementioned cross-linkable oligomer or polymer (C), but rather means there is mutual phase-insolubility of the various specific components used in the aforementioned oligomer or polymer (d1) and the aforementioned cross-linkable oligomer or polymer (C).

The aforementioned oligomer or polymer (d1) is exemplified by polycarbonate-based, aliphatic-based, saturated hydrocarbon-based, acrylic-based, or plant derived-based polymers or copolymers, or the like.

Here, the aliphatic-based polymer or copolymer is exemplified by liquid diene type polymers such as polyisoprene, polybutadiene, styrene-butadiene copolymers, or the like; chloroprene rubbers; butyl rubbers; nitrile rubbers; rubbers modified by partial hydrogenation rubbers having the below described reactive functional groups; or the like.

Moreover, the saturated hydrocarbon based polymer or copolymer is exemplified by hydrogenated polyisoprene, hydrogenated polybutadiene, ethylene-propylene, epichlorohydrin, chlorinated polyethylene, chlorosulfonated polyethylene, hydrogenated nitrile rubber, polyisobutylene, acrylic rubber, or the like.

Moreover, the aforementioned polycarbonate-based polymer or copolymer is exemplified by polycarbonate-based polymers or copolymers obtained by ester exchange reaction between polyol compounds (such as 1,6-hexanediol, 1,4-butanediol, 1,5-pentanediol, or the like) and dialkyl carbonates.

The aforementioned acrylic-based polymer or copolymer is exemplified by acrylic polyols; homopolymers of acrylates such as acrylate, methyl acrylate, ethyl acrylate, butyl acrylate, 2-ethylhexyl acrylate, or the like; acrylate copolymers combining two or more of such acrylates; or the like.

Furthermore, the aforementioned plant derived type of polymer or copolymer is exemplified by various types of elastomers derived from plant oils-fats such as castor oil, soybean oil, or the like; modified polyester polyols produced by modification of polylactic acid or the like; or the like.

Among such polymers or copolymers, aliphatic type polymers or copolymers are preferred, and liquid diene type polymers are further preferred due to further improved performance of the tire on ice and wear resistance.

Here, the liquid polyisoprene commercial products are exemplified by Kuraprene LIR-30, Kuraprene LIR-50 (produced by Kuraray Co., Ltd.), Poly IP (produced by Idemitsu Kosan Co., Ltd.), or the like.

Moreover, liquid polybutadienes are exemplified by homopolymer type liquid polybutadienes such as Kuraprene LBR-305 (produced by Kuraray Co., Ltd.) or the like; copolymers of 1,2-bond type butadiene and 1,4-bond type butadiene such as Poly BD (produced by Idemitsu Kosan Co., Ltd.) or the like; copolymers of ethylene and 1,4-bond type butadiene and 1,2-bond type butadiene such as Kuraprene L-SBR-820 (produced by Kuraray Co., Ltd.) or the like; or the like.

In the present invention, due to the ability for the aforementioned oligomer or polymer (d1) alone to be three dimensionally crosslinked in the aforementioned cross-linkable oligomer or polymer (C), the aforementioned oligomer or polymer (d1) preferably has at least one or more reactive functional group that differs from the aforementioned reactive functional group of the aforementioned cross-linkable oligomer or polymer (C), that does not react with the aforementioned reactive functional group of the aforementioned cross-linkable oligomer or polymer (C), and that is selected from the group composed of a hydroxyl group, a silane functional group, an isocyanate group, a (meth)acryloyl group, an allyl group, a carboxy group, an acid anhydride group, and an epoxy group.

Here, the aforementioned silane functional group is also called a cross-linkable silyl group. Specific examples of the silane functional group include the same silane functional groups mentioned above as possessed by the cross-linkable oligomer or polymer (C), as exemplified by hydrolyzable silyl groups; silanol groups; functional groups obtained by substitution of a silanol group by acetoxy group derivatives, enoxy group derivatives, oxime group derivatives, amine derivatives, or the like; or the like.

After three dimensional crosslinking of the aforementioned oligomer or polymer (d1), the aforementioned cross-linkable oligomer or polymer (C) may have the same reactive functional group (such as a carboxy group, hydrolyzable silyl group, or the like) as that of the aforementioned oligomer or polymer (d1), or a functional function group already possessed by the aforementioned cross-linkable oligomer or polymer (C) may be modified to form the same aforementioned reactive functional group as that of the oligomer or polymer (d1).

For ready promotion of the aforementioned three dimensional crosslinking of the oligomer or polymer (d1), among such functional groups, the reactive functional group possessed by the oligomer or polymer (d1) is preferably a hydroxyl group, a silane functional group, a carboxy group, or an acid anhydride group; and further preferably is a carboxy group or an acid anhydride group.

Here, liquid polyisoprene commercial products having a carboxy group are exemplified by Kuraprene LIR-400 (isoprene-maleic acid monomethyl ester-modified isoprene copolymer, number average molecular weight=25,000, produced by Kuraray Co., Ltd.) or the like. Liquid polyisoprene commercial products having an acid anhydride group are exemplified by Kuraprene LIR-403 (isoprene-maleic acid anhydride-modified isoprene copolymer, number average molecular weight=34,000, produced by Kuraray Co., Ltd.) or the like.

In the present invention, the aforementioned oligomer or polymer (d1) preferably has the aforementioned reactive functional group at least at the terminus of the chain of the oligomer or polymer (d1). If the main chain is a straight chain, the oligomer or polymer (d1) preferably has at least 1.5 or more of such reactive groups, and further preferably has at least 2 or more of such reactive groups. On the other hand, if the main chain is branched, the oligomer or polymer (d1) preferably has at least 3 or more of such reactive groups.

No particular limitation is placed on the mass average molecular weight or number average molecular weight of the aforementioned oligomer or polymer (d1). However, in order to obtain a suitable degree of crosslinking and particle diameter of the fine particles (D), and in order to further improve performance of the tire on ice, this mass average molecular weight or number average molecular weight is preferably 1,000 to 100,000, and further preferably is 3,000 to 60,000.

Here, the mass average molecular weight and number average molecular weight are both measured by conversion to standard polystyrene using gel permeation chromatography (GPC).

(Method of Preparation of Fine Particles (D))

The method of preparation of the fine particles (D) by three dimensionally crosslinking the aforementioned oligomer or polymer (d1) in the aforementioned cross-linkable oligomer or polymer (C) is exemplified by methods such as three dimensional crosslinking using the aforementioned reactive functional group possessed by the aforementioned oligomer or polymer (d1). Specifically, methods are cited such as three dimensional crosslinking by reaction between the aforementioned oligomer or polymer (d1) having the aforementioned reactive functional group and at least one component (d2) selected from the group composed of water, catalysts, and a compound having a functional group that reacts with the aforementioned reactive functional group.

Water may be used appropriately as the aforementioned component (d2) if the aforementioned oligomer or polymer (d1) has a hydrolyzable silyl group, isocyanate group, or acid anhydride group as the reactive functional group.

Moreover, the aforementioned component (d2) catalyst is exemplified by condensation catalysts for the silanol group (silanol condensation catalysts) or the like.

Specific examples of the aforementioned silanol condensation catalyst include dibutyltin dilaurate, dibutyltin dioleate, dibutyltin diacetate, tetrabutyl titanate, tin (I) octanoate, or the like.

Moreover, the compound having the functional group reactive with the aforementioned reactive functional group of the aforementioned component (d2) is exemplified by hydroxyl group-containing compounds, silanol compounds, hydrosilane compounds, diisocyanate compounds, amine compounds, oxazolidine compounds, enamine compounds, ketimine compounds, or the like.

The aforementioned hydroxyl group-containing compound may be suitably used when the aforementioned oligomer or polymer (d1) has as the reactive functional group an isocyanate group or acid anhydride group.

The aforementioned hydroxyl group-containing compound may be any compound that has at least two hydroxyl groups in a single molecule, without limitation according to molecular weight, structure of the compound, or the like. The aforementioned hydroxyl group-containing compound is exemplified by low molecular weight polyhydric alcohols, polyether polyols, polyester polyols, polycarbonate polyols, polycaprolactone polyols, other polyols, and mixtures of such polyols.

The aforementioned silanol compound may be used appropriately if the aforementioned oligomer or polymer (d1) has a silane functional group as the reactive functional group.

Specific examples of the aforementioned silanol compound include tert-butyldimethylsilanol, diphenylmethylsilanol, polymethylsiloxanes having the silanol group, cyclic polysiloxanes having the silanol group, or the like.

The aforementioned hydrosilane compound is a compound that has a SiH group. The aforementioned hydrosilane compound may be used appropriately if the aforementioned oligomer or polymer (d1) has an allyl group as the reactive functional group.

Specific examples of the aforementioned hydrosilane compound include 1,1,3,3-tetramethyldisiloxane, 1,3,5,7-tetramethyltetracyclosiloxane, 1,3,5,7,8-pentamethylpentacyclosiloxane, or the like.

The aforementioned diisocyanate compound may be used appropriately if the aforementioned oligomer or polymer (d1) has a hydroxyl group as the reactive functional group.

Specific examples of the aforementioned diisocyanate compound include aromatic polyisocyanates such as TDI (such as 2,4-tolylene diisocyanate (2,4-TDI) and 2,6-tolylene diisocyanate (2,6-TDI)), MDI (such as 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), triphenylmethane triisocyanate, or the like; aliphatic polyisocyanates such as hexamethylene diisocyanate (HDI), trimethylhexamethylene diisocyanate (TMHDI), lysine diisocyanate, norbornane diisocyanate methyl (NBDI), or the like; or the like.

The aforementioned amine compound may be used appropriately if the aforementioned oligomer or polymer (d1) has an isocyanate group, carboxy group, acid anhydride group, epoxy group, or the like as the reactive functional group.

No limitation is placed on molecular weight, structure, or the like of the aforementioned amine compound as long as the amine compound is a compound that has an amino group within a single molecule. This amine compound is exemplified by primary amines such as butylamine, hexylamine, octylamine, dodecylamine, oleylamine, cyclohexylamine, benzylamine or the like; secondary amines such as dibutylamine or the like; polyamines such as diethylenetriamine, triethylenetetramine, guanidine, diphenylguanidine, xylylenediamine, or the like; or the like.

The aforementioned oxazolidine compound, the aforementioned enamine compound, and the aforementioned ketimine compound may be used appropriately if the aforementioned oligomer or polymer (d1) has an isocyanate group, acid anhydride group, epoxy group, or the like as the reactive functional group.

Specific examples of such compounds include compounds previously known for use as latent curing agents. Among such latent curing agents, the use of oxazolidine compounds and/or ketimine compounds is preferred.

The aforementioned oxazolidine compound may be any oxazolidine compound that has within a single molecule at least one or more oxazolidine ring (i.e. 5-member ring including oxygen and nitrogen). Specific examples of the oxazolidine compound include N-hydroxyalkyl oxazolidine, oxazolidine silyl ether, carbonate oxazolidine, ester oxazolidine, or the like.

A commercially marketed product may be used as this oxazolidine compound, as exemplified by Hardener OZ (ester oxazolidine, produced by Sumika Bayer Urethane Co., Ltd.).

The ketimine compound is a compound that, by hydrolysis, generates a primary amine as a compound including active hydrogen groups. In the present invention, compounds having a C=N bond (ketimine bond) derived from a ketone or aldehyde and amine are taken to be "ketimine" compounds, and thus ketimines include aldimines having the —HC=N bond.

The ketimine is exemplified by compounds having a structure where a branch carbon atom or cyclic carbon atom is bonded to an α position atom of a carbon atom and/or nitrogen atom of the ketimine bond. The ring carbon atom is exemplified by a carbon atom forming an aromatic ring and a carbon atom forming an aliphatic ring.

Specific examples of ketimine compounds include: (1) ketimines that are products from reaction between polyamine and carbonyl compounds, and (2) ketimine compounds including silicon that are products from reaction between aminoalkoxysilanes and carbonyl compounds.

Commercially marketed products that may be used as such ketimine compounds include jER Cure H3 (produced by Mitsubishi Chemical Corp), KBE-9103 (produced by Shin-Etsu Chemical Co., Ltd.), or the like.

In the present invention, a solvent may be used when preparing the fine particles (D) by crosslinking the aforementioned polymer or oligomer (d1) in the aforementioned cross-linkable polymer or oligomer (C), as may be required.

Usage modes of the aforementioned solvent include modes used as a plasticizer, diluent, or solvent that is a good solvent in the aforementioned oligomer or polymer (d1) and is a poor solvent in the aforementioned cross-linkable oligomer or polymer (C); and/or modes used as a plasticizer, diluent, or solvent that is a poor solvent in the aforementioned oligomer or polymer (d1) and is a good solvent in the aforementioned cross-linkable oligomer or polymer (C).

Specific examples of such solvents include aliphatic hydrocarbons such as n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, isooctane; alicyclic hydrocarbons such as cyclopentane, cyclohexane, methylcyclopentane, or the like; aromatic hydrocarbons such as xylene, benzene, toluene, or the like; terpene based organic solvents such as α-pinene, β-pinene, limonene, or the like; or the like.

Moreover, in the present invention, during the preparation of the fine particles (D) by three dimensional crosslinking of the aforementioned oligomer or polymer (d1) in the aforementioned cross-linkable oligomer or polymer (C), preparation is preferably performed using additives such as surfactants, emulsifiers, dispersion agents, silane coupling agents, or the like.

<Silane Coupling Agent>

The tire rubber composition of the present invention preferably includes a silane coupling agent in order to improve reinforcing ability of the tire when the aforementioned white filler (particularly silica) is included in the tire rubber composition of the present invention.

When the aforementioned silane coupling agent is blended, the blended amount relative to 100 parts by mass of the aforementioned white filler is preferably from 0.1 to 20 parts by mass, and further preferably is from 4 to 12 parts by mass.

The aforementioned silane coupling agent is exemplified by bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazoletetrasulfide, 3-triethoxysilylpropylbenzothiazoletetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazole tetrasulfide, or the like. Such silane coupling agents may be used as one type or as a combination or two or more types.

Among these silane coupling agents, from the standpoint of the reinforcement ability improvement effect, the use of bis-(3-triethoxysilylpropyl)tetrasulfide and/or bis-(3-triethoxysilylpropyl)disulfide is preferred. Specific examples include Si 69 (bis-(3-triethoxysilylpropyl)tetrasulfide, produced by Evonick-Degussa), Si 75 (bis-(3-triethoxysilylpropyl)disulfide, produced by Evonick-Degussa), or the like.

<Other Ingredients>

In addition to the aforementioned components (i.e. in addition to the aforementioned diene type rubber (A), the aforementioned carbon black and/or white filler (B), the aforementioned cross-linkable oligomer or polymer (C), and the aforementioned fine particles (D)), the tire rubber composition of the present invention may include various types of other blended additives normally used in tire rubber compositions. Such blended additives are exemplified by fillers such as calcium carbonate or the like; vulcanizing agents such as sulfur or the like; vulcanization accelerators such as sulfenamide type, guanidine type, thiazole type, thiourea type, or similar vulcanization accelerators; vulcanization accelerator promoters such as zinc oxide, stearic acid, or the like; waxes; aromatic oils; antiaging agents; plasticizers; or the like.

Compounded amounts of these additives may be any conventional amount, so long as the object of the present invention is not hindered. For example, in 100 parts by mass of the diene type rubber (A), from 0.5 to 5 parts by mass of sulfur may be blended, from 0.1 to 5 parts by mass of the vulcanization accelerator may be blended, from 0.1 to 10 parts by mass of the vulcanization accelerator promoter may be blended, from 0.5 to 5 parts by mass of the antiaging agent may be blended, from 1 to 10 parts by mass of the wax may be blended, and from 5 to 30 parts by mass of the aromatic oil may be blended.

<Production Method for Tire rubber Composition>

There are no particular restrictions to the method for producing the tire rubber composition of the present invention, and an example is the method whereby each of the above-mentioned components is kneaded using a publicly known method and device (such as a Banbury mixer, kneader, or roll).

In addition, the tire rubber composition of the present invention can be vulcanized or crosslinked under conventional, publicly known vulcanizing or crosslinking conditions.

[Studless Tires]

The studless tire of the present invention (sometimes referred to hereinafter simply as the "tire of the present invention") is a studless tire that uses the aforementioned tire rubber composition of the present invention for the tire tread.

FIG. 1 is a schematic partial cross-sectional drawing showing an example of an embodiment of the studless tire of the present invention, although the tire of the present invention is not limited to the embodiment shown in FIG. 1.

In FIG. 1, 1 represents a bead portion, 2 represents a side wall portion, and 3 represents a tread portion formed from the rubber composition for a tire of the present invention.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The tire of the present invention, for example, may be produced by forming the tire tread portion by vulcanization or crosslinking at a temperature corresponding to the types and blended proportions of the diene type rubber, vulcanization or crosslinking agent, and vulcanization or crosslinking promoter used in the tire rubber composition of the present invention.

EXAMPLES

<Preparation of Fine Particle-containing Cross-linkable Polymer 1>

A concentric double shaft mixer (manufactured by Inoue Seisakusho) at low mixing speed (36 rpm) and high disperser speed (600 rpm) was used for 1 h of mixing of 400 g of maleic acid-modified liquid polyisoprene rubber (Kuraprene LIR-403, number average molecular weight=34,000, produced by Kuraray Co., Ltd.), 120 g of process oil (Diana Process Oil PS-32, manufactured by Idemitsu Kosan Co., Ltd.), 16 g of an oxazolidine compound (Hardener OZ, produced by Sumika Bayer Urethane Co., Ltd.), 1,600 g of hydrolyzable silyl group-terminated polyoxypropylene glycol (MS Polymer S 810, produced by Kaneka Corp.), and 5 g of water.

Thereafter, 6 g of Pluronic type nonionic surfactant (NEWPOL PE-64, produced by Sanyo Chemical Industries, Ltd.) and 6 g of aminosilane (A 1110, produced by Nippon Unicar Co., Ltd.) were added, and the mixture was mixed for a further 30 minutes at low speed (36 rpm) and high disperser speed (2,000 rpm) to prepare a paste-like product (referred to hereinafter as the "fine particle-containing cross-linkable polymer 1".

This paste-like product was observed using a laser microscope VK-8710 (manufactured by Keyence Corp.). It was confirmed that fine particles (polyisoprene backbone, crosslinked by amide ester bond) were generated of 5 to 40 μm particle diameter, and it was confirmed that these particles were dispersed in the hydrolyzable silyl group-terminated polyoxypropylene glycol. Moreover, this image was image-processed, and 3D profiling was performed. The fine particle content (% by weight) in the paste-like product was found to be about 22%.

<Preparation of Fine Particle 1>

The hydrolyzable silyl group-terminated polyoxypropylene glycol (i.e. cross-linkable oligomer or polymer (C)) was removed from the fine particle-containing cross-linkable polymer 1 to obtain gel fine particles (referred to hereinafter as the "fine particle 1").

<Preparation of Fine Particle-containing Cross-linkable Polymer 2>

A Mixing Taro mixer (manufactured by Thinky Co., Ltd.) was used for 40 minutes to mix 6 g of maleic acid-modified liquid polyisoprene rubber (Kuraprene LIR-403, number average molecular weight=34,000, produced by Kuraray Co., Ltd.), 2 g of process oil (Diana Process Oil PS-32, produced by Idemitsu Kosan Co., Ltd.), 0.5 g of an oxazolidine compound (Hardener OZ, produced by Sumika Bayer Urethane Co., Ltd.), 90 g of polypropylene glycol (PREMINOL PML-7003, produced by Asahi Glass Co., Ltd.), and 0.1 g of water.

Thereafter, 0.1 g of Pluronic type nonionic surfactant (NEWPOL PE-64, produced by Sanyo Chemical Industries, Ltd.) was added, and the mixture was mixed for a further 30 minutes to prepare a paste-like product (referred to hereinafter as the "fine particle-containing cross-linkable polymer 2").

This paste-like product was observed using a laser microscope VK-8710 (manufactured by Keyence Corp.). It was confirmed that fine particles (polyisoprene backbone, crosslinked by amide ester bond) were generated of 900 nm (0.9 μm) average particle diameter, and it was confirmed that these particles were dispersed in the polypropylene glycol. Moreover, this image was image-processed, and 3D profiling was performed. The fine particle content (% by weight) in the paste-like product was found to be about 7%.

<Preparation of Fine Particle-containing Cross-linkable Polymer>

A concentric double shaft mixer (manufactured by Inoue Seisakusho) at low speed mixing (36 rpm) and high disperser speed (600 rpm) was used for 25 minutes of mixing of 200 g of maleic acid-modified liquid polyisoprene rubber (Kuraprene LIR-403, number average molecular weight=34,000, produced by Kuraray Co., Ltd.), 100 g of process oil (Diana Process Oil PS-32, manufactured by Idemitsu Kosan Co., Ltd.), 7 g of an oxazolidine compound (Hardener OZ, produced by Sumika Bayer Urethane Co., Ltd.), 1,600 g of polypropylene glycol (PREMINOL PML-7003, produced by Asahi Glass Co., Ltd.), and 2 g of water.

Thereafter, 1 g of Pluronic type nonionic surfactant (NEWPOL PE-64, produced by Sanyo Chemical Industries, Ltd.) and 2.5 g of aminosilane (KBM-602, produced by Shin-Etsu Chemical Co., Ltd.) were added, and the mixture was mixed for a further 10 minutes at low speed (36 rpm) and high disperser speed (400 rpm) to prepare a paste-like product (referred to hereinafter as the "fine particle-containing cross-linkable polymer 3").

This paste-like product was observed using a laser microscope VK-8710 (manufactured by Keyence Corp.). It was confirmed that fine particles (polyisoprene backbone, crosslinked by amide ester bond) were generated of 210 μm average particle diameter, and it was confirmed that these particles were dispersed in the polypropylene glycol. Moreover, this image was image-processed, and 3D profiling was performed. The fine particle content (% by weight) in the paste-like product was found to be about 14%.

<Preparation of Fine Particle-containing Cross-linkable Polymer 4>

100 g of hydroxyl group-terminated liquid polyisoprene (Poly IP, average molecular weight=2,500, hydroxyl group value=46.6, produced by Idemitsu Kosan Co., Ltd.), 5.5 g of m-xylylene diisocyanate (TAKENATE 500, produced by Mitsui Chemicals, Ltd.), and 60 g of process oil (Diana Process Oil PS-32, manufactured by Idemitsu Kosan Co., Ltd.) were mixed for 6 h at 80° C. in a three-neck flask.

Thereafter, the mixture was cooled to 50° C. Then 850 g of hydrolyzable silyl group-terminated polyoxypropylene glycol (EXCESTAR ES-S 2410, produced by Asahi Glass Co., Ltd.), 1.4 g of m-xylylene diisocyanate (TAKENATE 500, produced by Mitsui Chemicals, Ltd.), and 0.9 g of 1,4-butanediol (produced by Mitsui Chemicals, Ltd.) were added, and the mixture was mixed for 30 minutes at 80° C. Thereafter, 2.0 g of polyoxyethylene sorbitan tristearate (LEODOL TW-0320V, produced by Kao Corp.) was added, and the mixture was stirred for 4 h to prepare a white cloudy paste-like product (referred to hereinafter as the "fine particle-containing cross-linkable polymer 4").

This paste-like product was observed using a laser microscope VK-8710 (manufactured by Keyence Corp.). It was confirmed that fine particles (polyisoprene backbone, crosslinked by urethane bond) were generated of 5 to 10 μm particle diameter, and it was confirmed that these particles were dispersed in the hydrolyzable silyl group-terminated polyoxypropylene glycol. Moreover, this image was image-processed, and 3D profiling was performed. The fine particle content (% by weight) in the paste-like product was found to be about 10%.

<Preparation of Fine Particle-containing Cross-linkable Polymer 5>

1,000 g of hydroxyl group-terminated polyoxypropylene glycol (PREMINOL S-4012, number average molecular weight=10,000, hydroxyl group value=11.2, produced by Asahi Glass Co., Ltd.), and 51.8 g of 3-isocyanate propyltriethoxysilane (A-1310, produced by Momentive Performance Materials Japan LLC) were loaded into a three-necked flask, and the mixture was stirred for 8 h at 80° C. to obtain a hydrolyzable silyl group-terminated polyether.

Thereafter, the mixture was cooled to 50° C., and then 100 g of hydroxyl group-terminated polybutadiene (Poly BD R45HT, average molecular weight=2,800, hydroxyl group value=46.6, produced by Idemitsu Kosan Co., Ltd.), 60 g of polybutene (H-100, produced by BP-Amoco), 6.0 g of m-xylylene diisocyanate (TAKENATE 500, produced by Mitsui Chemicals, Ltd.), and 1.0 g of a 75% ethyl acetate solution of the trimethylolpropane adduct of xylylene diisocyanate (TAKENATE D110N, NCO content=11.5%, produced by Mitsui Takeda Chemicals, Inc.) were added. The mixture was stirred again at 80° C. for 5 h to produce a white milky paste-like product (referred to as the "fine particle-containing cross-linkable polymer 5").

This paste-like product was observed using a laser microscope VK-8710 (manufactured by Keyence Corp.). It was confirmed that fine particles (polybutadiene backbone, crosslinked by urethane bond) were generated of 5 to 10 μm particle diameter, and it was confirmed that these particles were dispersed in the hydrolyzable silyl group-terminated polyether. Moreover, this image was image-processed, and 3D profiling was performed. The fine particle content (% by weight) in the paste-like product was found to be about 11%.

<Preparation of Fine Particle-containing Cross-linkable Polymer 6>

850 g of hydroxyl group-containing acrylic-based polyol (ARUFON UH-2000, mass average molecular weight=11,000, hydroxyl group value=20, produced by Toagosei Co., Ltd.) and 78.7 g of isocyanate propyltriethoxysilane (A-1310, produced by Momentive Performance Materials Japan LLC) were loaded into a three-necked flask, and the mixture was stirred for 8 h at 80° C. to obtain a hydrolyzable silyl group-terminated acrylic polyether.

Thereafter, the mixture was cooled to 50° C. Then 88 g of maleic acid-modified polyisoprene rubber (Kuraprene LIR-403, number average molecular weight=34,000, produced by Kuraray Co., Ltd.), 64 g of process oil (Diana Process Oil PS-32, produced by Idemitsu Kosan Co., Ltd.), 10 g of an oxazolidine compound (Hardener OZ, produced by Sumika Bayer Urethane Co., Ltd.), and 2 g of distilled water were added, and the mixture was stirred for 30 minutes. Thereafter, 1 g of polyoxyethylene sorbitan tristearate (LEODOL TW-0320V, produced by Kao Corp.) was added, and the mixture was stirred for 30 minutes. Thereafter, the mixture was heated to 110° C., and the mixture was further stirred while deaeration was performed by vacuum to prepare a white cloudy paste-like product (referred to hereinafter as the "fine particle-containing cross-linkable polymer 6").

This paste-like product was observed using a laser microscope VK-8710 (manufactured by Keyence Corp.). It was confirmed that fine particles (polyisoprene backbone, crosslinked by amide ester bond) were generated of 10 to 20 μm particle diameter, and it was confirmed that these particles were dispersed in the hydrolyzable silyl group-terminated acrylic polyether. Moreover, this image was image-processed, and 3D profiling was performed. The fine particle content (% by weight) in the paste-like product was found to be about 12%.

<Preparation of Fine Particle-containing Cross-linkable Polymer 7>

Except for replacement of the 88 g of Kuraprene LIR-403 (produced by Kuraray Co., Ltd.) and 64 g of Diana Process Oil PS-32 (produced by Idemitsu Kosan Co., Ltd.) by 152 g of acid anhydride-modified polybutadiene (POLYVEST OC 800S, number average molecular weight=1,800 to 2,400, produced by Evonik Degussa GmbH), the same method as that of the fine particle-containing cross-linkable polymer 6 was used to prepare a yellowish-white paste-like product (referred to hereinafter as the "fine particle-containing cross-linkable polymer 7").

This paste-like product was observed using a laser microscope VK-8710 (manufactured by Keyence Corp.). It was confirmed that fine particles (polybutadiene backbone, crosslinked by amide ester bond) were generated of 10 to 20 μm particle diameter, and it was confirmed that these particles were dispersed in the hydrolyzable silyl group-terminated acrylic polyether. Moreover, this image was image-processed, and 3D profiling was performed. The fine particle content (% by weight) in the paste-like product was found to be about 12%.

<Preparation of Fine Particle-containing Cross-linkable Polymer 8>

850 g of polycarbonate diol (DURANOL T5652, number average molecular weight=2,000, hydroxyl group value=56, produced by Asahi Kasei Chemicals Corp.), 150 g of acid anhydride-modified polybutadiene (POLYVEST OC800S, number average molecular weight=1,800 to 2,400, produced by Evonik Degussa GmbH), and 10 g of a ketimine compound (HOK-01, produced by Toyo Gosei Co., Ltd.) were stirred for 3 h at 60° C. in a three-necked flask.

Thereafter, 200 g of 3-isocyanate propyltriethoxysilane (A-1310, produced by Momentive Performance Materials Japan LLC) was added, the mixture was heated to 80° C., and was stirred for 5 h to produce a yellowish white milky paste-like product (referred to hereinafter as the "fine particle-containing cross-linkable polymer 8").

This paste-like product was observed using a laser microscope VK-8710 (manufactured by Keyence Corp.). It was confirmed that fine particles (polybutadiene backbone, crosslinked by amide bond) were generated of 10 to 30 μm particle diameter, and it was confirmed that these particles were dispersed in the hydrolyzable silyl group-terminated polycarbonate diol. Moreover, this image was image-processed, and 3D profiling was performed. The fine particle content (% by weight) in the paste-like product was found to be about 12%.

<Preparation of Fine Particle-containing Cross-linkable Polymer 9>

Except for the use of 10 of a ketimine compound (HOK-01, produced by Toyo Gosei Co., Ltd.) rather than 10 g of an oxazolidine compound (Hardener OZ, produced by Sumika Bayer Urethane Co., Ltd.), and except for non-addition of 2 g of distilled water, the same method as that of the particle-containing cross-linkable polymer 7 was used to produced the yellow ocher-colored milky paste-like product (referred to hereinafter as the "fine particle-containing cross-linkable polymer 9").

This paste-like product was observed using a laser microscope VK-8710 (manufactured by Keyence Corp.). It was confirmed that fine particles (polybutadiene backbone, crosslinked by amide bond) were generated of 5 to 20 μm particle diameter, and it was confirmed that these particles were dispersed in the hydrolyzable silyl group-terminated acrylic polyether. Moreover, this image was image-processed, and 3D profiling was performed. The fine particle content (% by weight) in the paste-like product was found to be about 12%.

<Preparation of Fine Particle-containing Cross-linkable Polymer 10>

800 g of hydroxyl group-terminated polyoxypropylene glycol (PREMINOL S-4012, number average molecular weight=10,000, hydroxyl group value=11.2, produced by Asahi Glass Co., Ltd.), 150 g of acid anhydride-modified polybutadiene (POLYVEST OC 800S, number average molecular weight=1,800 to 2,400, produced by Evonik Degussa GmbH), and 10 g of a ketimine compound (HOK-01, produced by Toyo Gosei Co., Ltd.) were stirred for 3 h in a three-neck flask.

Thereafter, 41.4 g of 3-isocyanate propyltriethoxysilane (A-1310, produced by Momentive Performance Materials Japan LLC) was added, and the mixture was stirred for 5 h at 80° C. to prepare a yellow ochre colored milky paste-like product (referred to hereinafter as the "fine particle-containing cross-linkable polymer 10").

This paste-like product was observed using a laser microscope VK-8710 (manufactured by Keyence Corp.). It was confirmed that fine particles (polybutadiene backbone, crosslinked by amide bond) were generated of 10 μm particle diameter, and it was confirmed that these particles were dispersed in the hydrolyzable silyl group-terminated polypropylene glycol. Moreover, this image was image-processed, and 3D profiling was performed. The fine particle content (% by weight) in the paste-like product was found to be about 14%.

<Preparation of Fine Particle-containing Cross-linkable Polymer 11>

236 g of a polycarbonate diol (DURANOL T5652, number average molecular weight=2,000, hydroxyl group value=56, produced by Asahi Kasei Chemicals Corp.) and 61 g of 3-isocyanate propyltriethoxysilane (A-1310, produced by Momentive Performance Materials Japan LLC) were loaded into a three-neck flask, and the mixture was stirred for 6 h at 80° C. to obtain a hydrolyzable silyl group-terminated polycarbonate.

After cooling the mixture down to room temperature, 553 g of hydrolyzable silyl group-terminated acrylic polyether obtained during the preparation of the fine particle-containing cross-linkable polymer 6 was added to this mixture, and the mixture was blended.

To this mixed liquid were added 150 g of acid anhydride-modified polybutadiene (POLYVEST OC 800S, number average molecular weight=1,800 to 2,400, produced by Evonik Degussa GmbH) and 18 g of an oxazolidine compound (Hardener OZ, produced by Sumika Bayer Urethane Co., Ltd.), and the mixture was stirred for 1.5 h at 55° C. to prepare a yellowish white milky paste-like product (referred to hereinafter as the "fine particle-containing cross-linkable polymer 11").

This paste-like product was observed using a laser microscope VK-8710 (manufactured by Keyence Corp.). It was confirmed that fine particles (polybutadiene backbone, crosslinked by amide ester bond) were generated of 5 to 20 μm particle diameter, and it was confirmed that these particles were dispersed in mixture of the hydrolyzable silyl group-terminated polycarbonate and the hydrolyzable silyl group-terminated acrylic polyether. Moreover, this image was image-processed, and 3D profiling was performed. The fine particle content (% by weight) in the paste-like product was found to be about 15%.

<Preparation of Fine Particle-containing Cross-linkable Polymer 12>

236 g of a polycarbonate diol (DURANOL T5652, number average molecular weight=2,000, hydroxyl group value=56, produced by Asahi Kasei Chemicals Corp.) and 61 g of 3-isocyanate propyltriethoxysilane (A-1310, produced by Momentive Performance Materials Japan LLC) were loaded into a three-neck flask, and the mixture was stirred for 6 h at 80° C. to obtain a hydrolyzable silyl group-terminated polycarbonate.

After cooling the mixture down to room temperature, 553 g of hydrolyzable silyl group-terminated acrylic polyether obtained during the preparation of the fine particle-containing cross-linkable polymer 6 was added to this mixture, and the mixture was blended.

To this mixed liquid were added 90 g of maleic acid-modified liquid polyisoprene rubber (Kuraprene LIR-403, number average molecular weight=34,000, produced by Kuraray Co., Ltd.), 60 g of process oil (Diana Process Oil PS-32, produced by Idemitsu Kosan Co., Ltd.), 10 g of an oxazolidine compound (Hardener OZ, produced by Sumika Bayer Urethane Co., Ltd.), and 0.5 g of distilled water. The mixture was then stirred for 0.5 h at 55° C. Thereafter, the mixture was heated to 100° C., and the mixture was vacuum deaerated for 1 h to prepare a yellowish ocher colored milky paste-like product (referred to hereinafter as the "fine particle-containing cross-linkable polymer 12").

This paste-like product was observed using a laser microscope VK-8710 (manufactured by Keyence Corp.). It was confirmed that fine particles (polyisoprene backbone, crosslinked by amide ester bond) were generated of 5 to 15 μm particle diameter, and it was confirmed that these particles were dispersed in mixture of the hydrolyzable silyl group-terminated polycarbonate and the hydrolyzable silyl group-terminated acrylic polyether. Moreover, this image was image-processed, and 3D profiling was performed. The fine particle content (% by weight) in the paste-like product was found to be about 15%.

<Preparation of Fine Particle-containing Cross-linkable Polymer 13>

120 g of hydroxyl group-terminated liquid polyisoprene (Poly IP, number average molecular weight=2,500, hydroxyl group value=46.6, produced by Idemitsu Kosan Co., Ltd.) and 24.7 g of 3-isocyanate propyltriethoxysilane (A-1310, Momentive Performance Materials Japan LLC) were loaded in a three-neck flask, and the mixture was stirred for 8 h at 80° C. to obtain hydrolyzable silyl group-terminated polyisoprene.

To this product was added 850 g of hydroxyl group-terminated polyoxypropylene glycol (PREMINOL S-4012, number average molecular weight=10000, hydroxyl group value=11.2, produced by Asahi Glass Co., Ltd.), 0.2 g of distilled water, and 1 g of an octyl tin compound (NEOSTANN S-1, produced by Nitto Kasei Co., Ltd.), and the mixture was stirred for 3 h at 80° C. Thereafter, the mixture was heated to 110° C. and was vacuum deaerated for 2 h. Thereafter, the mixture was cooled to 50° C., 32.7 g of m-xylylene diisocyanate (TAKENATE 500, produced by Mitsui Chemicals, Ltd.) was added, and the mixture was further stirred at 65° C. for 12 h to obtain a white milky paste-like product (referred to hereinafter as the "fine particle-containing cross-linkable polymer 13").

This paste-like product was observed using a laser microscope VK-8710 (manufactured by Keyence Corp.). It was confirmed that fine particles (polyisoprene backbone, crosslinked by siloxane bond) were generated of 5 to 15 μm particle diameter, and it was confirmed that these particles were dispersed in the isocyanate group-terminated polyoxypropylene glycol. Moreover, this image was image-processed, and 3D profiling was performed. The fine particle content (% by weight) in the paste-like product was found to be about 12%.

<Preparation of Fine Particle-containing Cross-linkable Polymer 14>

120 g of hydroxyl group-terminated liquid polyisoprene (Poly IP, number average molecular weight=2500, hydroxyl group value=46.6, produced by Idemitsu Kosan Co., Ltd.) and 24.7 g of 3-isocyanate propyltriethoxysilane (A-1310, produced by Momentive Performance Materials Japan LLC) were loaded into a three-neck flask, and the mixture was stirred for 8 h at 80° C. to obtain a hydrolyzable silyl group-terminated polyisoprene.

To this was added 850 g of hydroxyl group-terminated polyoxypropylene glycol (PREMINOL S-4012, number average molecular weight=10,000, hydroxyl group value=11.2, produced by Asahi Glass Co., Ltd.), 0.2 g of distilled water, and 1 g of a dioctyl tin compound (NEOSTANN S-1, produced by Nitto Kasei Co., Ltd.), and the mixture was stirred for 1 h at 80° C. Thereafter, 3 g of vinyltrimethoxysilane (A-171, produced by Momentive Performance Materials Japan LLC) and 2.5 g of polyoxyethylene sorbitan tristearate (LEODOL TW-0320V, produced by Kao Corp.) were added, and the mixture was stirred further for 2 h. Thereafter, the mixture was heated to 110° C., and vacuum deaeration was performed for 1 h. Thereafter, the mixture was cooled to 50° C., and 44 g of 3-isocyanate propyltriethoxysilane (A-1310, produced by Momentive Performance Materials Japan LLC) was added. The mixture was stirred further at 65° C. for 12 h to obtain a milky pate-like product (referred to hereinafter as the "fine particle-containing cross-linkable polymer 14").

This paste-like product was observed using a laser microscope VK-8710 (manufactured by Keyence Corp.). It was confirmed that fine particles (polyisoprene backbone, cross-linked by siloxane bond) were generated of 5 to 15 μm particle diameter, and it was confirmed that these particles were dispersed in the hydrolyzable silyl group-terminated polyoxypropylene glycol. Moreover, this image was image-processed, and 3D profiling was performed. The fine particle content (% by weight) in the paste-like product was found to be about 12%.

<Preparation of Fine Particle-containing Cross-linkable Polymer 15>

To 950 g of hydrolyzable silyl group-terminated polyoxypropylene glycol (MS Polymer S 810, produced by Kaneka Corp.) were added 47 g of maleic acid-modified liquid polyisoprene rubber (Kuraprene LIR-403, number average molecular weight=34,000, produced by Kuraray Co., Ltd.), 34 g of process oil (Diana process oil PS-32, produced by Idemitsu Kosan Co., Ltd.), 2 g of an oxazolidine compound (Hardener OZ, produced by Sumika Bayer Urethane Co., Ltd.), and 0.5 g of distilled water, and the mixture was stirred for 60 minutes at 50° C. in a three-neck flask. Thereafter, 0.2 g of vinyltrimethoxysilane (A-171, produced by Momentive Performance Materials Japan LLC) and 1 g of polyoxyethylene sorbitan tristearate (LEODOL TW-0320V, produced by Kao Corp.) were added, and the mixture was stirred for 30 minutes to obtain a milky paste-like product (referred to hereinafter as the "fine particle-containing cross-linkable polymer 15").

This paste-like product was observed using a laser microscope VK-8710 (manufactured by Keyence Corp.). It was confirmed that fine particles (polyisoprene backbone, cross-linked by amide ester bond) were generated of 10 to 30 μm particle diameter, and it was confirmed that these particles were dispersed in the hydrolyzable silyl group-terminated polyoxypropylene glycol. Moreover, this image was image-processed, and 3D profiling was performed. The fine particle content (% by weight) in the paste-like product was found to be about 7%.

<Preparation of Fine Particle-containing Cross-linkable Polymer 16>

To 705 g of hydrolyzable silyl group-terminated polyisoprene (EPION S-303S, produced by Kaneka Corp.) were added 60 g of acid anhydride-modified polybutadiene (POLYVEST OC 800S, number average molecular weight=1,800 to 2,400, produced by Evonik Degussa GmbH), 2 g of a ketimine compound (HOK-01, produced by Toyo Gosei Co., Ltd.), and 0.2 g of distilled water, and the mixture was stirred for 30 minutes at 60° C. in a three-neck flask. Thereafter, 0.2 g of vinyltrimethoxysilane (A-171, produced by Momentive Performance Materials Japan LLC) and 0.5 g of polyoxyethylene sorbitan tristearate (LEODOL TW-0320V, produced by Kao Corp.) were added, and the mixture was stirred for 1 h to obtain a white milky paste-like product (referred to hereinafter as the "fine particle-containing cross-linkable polymer 16").

This paste-like product was observed using a laser microscope VK-8710 (manufactured by Keyence Corp.). It was confirmed that fine particles (polybutadiene backbone, crosslinked by amide bond) were generated of 1 to 15 μm particle diameter, and it was confirmed that these particles were dispersed in the hydrolyzable silyl group-terminated polyisobutylene. Moreover, this image was image-processed, and 3D profiling was performed. The fine particle content (% by weight) in the paste-like product was found to be about 7%.

<Preparation of Fine Particle-containing Cross-linkable Polymer 17>

To 800 g of hydrolyzable silyl group-terminated polyisobutylene (EPION S-303S, produced by Kaneka Corp.) were added 40 g of hydroxyl group-terminated polyoxypropylene glycol (EXCENOL 5030, number average molecular weight=5,000, hydroxyl group value=33, produced by Asahi Glass Co., Ltd.), 160 g of hydroxyl group-terminated polyoxypropylene glycol (EXCENOL 2020, number average molecular weight=2,000, hydroxyl group value=56, produced by Asahi Glass Co., Ltd.), and 18.0 g of m-xylylene diisocyanate (TAKENATE 500, produced by Mitsui Chemicals, Ltd.) in a three-neck flask, and the mixture was stirred for 8 h at 80° C. to obtain a white milky paste-like product (referred to hereinafter as the "fine particle-containing cross-linkable polymer 17").

This paste-like product was observed using a laser microscope VK-8710 (manufactured by Keyence Corp.). It was confirmed that fine particles (polyoxypropylene glycol backbone, crosslinked by urethane bond) were generated of 5 to 15 μm particle diameter, and it was confirmed that these particles were dispersed in the hydrolyzable silyl group-terminated polyisobutylene. Moreover, this image was image-processed, and 3D profiling was performed. The fine particle content (% by weight) in the paste-like product was found to be about 20%.

<Preparation of Fine Particle-containing Cross-linkable Polymer 18>

280 g of a hydroxyl group-containing acrylic-based polyol (ARUFON UH-2000, mass average molecular weight=11,000, hydroxyl group value=20, produced by Toagosei Co., Ltd.) and 25.8 g of 3-isocyanate propyltriethoxysilane (A-1310, produced by Momentive Performance Materials Japan LLC) were loaded into a three-neck flask, and the mixture was stirred for 6 h at 90° C. to synthesize a hydrolyzable silyl group-terminated acrylic-based polymer.

Separately, 80 g of a polycarbonate diol (DURANOL T5652, number average molecular weight=2,000, hydroxyl group value=56, produced by Asahi Kasei Chemicals Corp.) and 3.76 g of xylylene diisocyanate (TAKENATE 500, produced by Mitsui Chemicals, Ltd.) were placed in a three-neck flask, and the mixture was stirred for 5 h at 80° C. to synthesize a polycarbonate-based polymer (a).

Separately, 50 g of polycarbonate diol (DURANOL T5652, number average molecular weight=2,000, hydroxyl group value=56, produced by Asahi Kasei Chemicals Corp.) and 4.6 g of xylylene diisocyanate (TAKENATE 500, produced by Mitsui Chemicals, Ltd.) were placed in a three-neck flask, and the mixture was stirred for 6 h at 80° C. to synthesize a polycarbonate-based polymer (b).

Thereafter, to 263 g of the previously synthesized hydrolyzable silyl group-terminated acrylic-based polymer were added 53 g of the polycarbonate-based polymer (a), 0.07 g of glycerin, and 31.7 g of the polycarbonate-based polymer (b), and the mixture was stirred for 3 h at 80° C. to produce a white milky paste-like product (referred to hereinafter as the "fine particle-containing cross-linkable polymer 18").

This paste-like product was observed using a laser microscope VK-8710 (manufactured by Keyence Corp.). It was confirmed that fine particles (polycarbonate backbone, crosslinked by urethane bond) were generated of 5 to 15 μm particle diameter, and it was confirmed that these particles were dispersed in the hydrolyzable silyl group-terminated acrylic-based polymer. Moreover, this image was image-processed, and 3D profiling was performed. The fine particle content (% by weight) in the paste-like product was found to be about 20%.

Working Examples 1 to 19 and Comparative Examples 1 to 8

The components shown in Table 1 below were blended at the proportions (parts by mass) shown in Table 1 below.

Specifically, a master batch was obtained by first kneading the components shown in Table 1 below, except for the sulfur and the vulcanization accelerator, for 5 minutes in a 1.7 liter closed type mixer, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition for 15 minutes at 170° C. in a mold for Lambourn abrasion (disk having a diameter of 63.5 mm and thickness of 5 mm).

<Performance on Ice>

A sheet obtained by vulcanization of each compound was attached to a rubber base having a flattened columnar shape. An inside drum type ice frictional force tester was used for measurement at a measurement temperature of −1.5° C., a load of 5.5 g/cm$^3$, and a drum rotation speed of 25 km/h.

The test results were normalized so that the indicated value (index) of Comparative Example 1 was taken to be 100. The test results are listed in the "performance on ice" row of Table 1. The larger the value, the more excellent the performance on ice and the higher the frictional force on ice.

Index=(measured value/friction coefficient on ice of Comparative Example 1 test piece)×100

<Wear Resistance>

Abrasion loss was measured using a Lambourn abrasion test machine (manufactured by Iwamoto Seisakusho Co.), according to JIS K 6264-2: 2005 under conditions using an applied force of 4.0 kg/cm$^3$ (=39 N), a slip ratio of 30%, a wear test time interval of 4 minutes, and room temperature as the test temperature.

The test results were normalized by the below listed formula so that the test value (index) was 100 for the measured value of Comparative Example 1. The test results are listed in the "wear resistance" row of Table 1. A larger index value shows lower abrasion loss and better wear resistance.

Index=(wear loss of Comparative Example 1 test piece/measured value)×100

TABLE 1

Table 1-1

| | Comparative Example | | | | | | | |
|---|---|---|---|---|---|---|---|---|
| | 1 | 2 | 3 | 4 | 5 | 6 | 7 | 8 |
| NR | 50 | 50 | 50 | 50 | 50 | 50 | 50 | 50 |
| BR | 50 | 50 | 50 | 50 | 50 | 50 | 50 | 50 |
| Carbon black | 35 | 35 | 35 | 35 | 35 | 35 | 35 | 35 |
| Silica | 25 | 25 | 25 | 25 | 25 | 25 | 25 | 25 |
| Silane coupling agent | 2 | 2 | 2 | 2 | 2 | 2 | 2 | 2 |
| fine particle-containing cross-linkable polymer 1 (fine particle content) | | 0.1 (0.02) | | | | | | |
| fine particle-containing cross-linkable polymer 2 (fine particle content) | | | | 3.0 (0.21) | | 6.0 (0.42) | | |
| fine particle-containing cross-linkable polymer 3 (fine particle content) | | | | | 3.0 (0.42) | | 6.0 (0.84) | |
| fine particle-containing cross-linkable polymer 4 | | | | | | | | |
| fine particle-containing cross-linkable polymer 5 | | | | | | | | |
| fine particle-containing cross-linkable polymer 6 | | | | | | | | |
| fine particle-containing cross-linkable polymer 7 | | | | | | | | |
| fine particle-containing cross-linkable polymer 8 | | | | | | | | |
| fine particle-containing cross-linkable polymer 9 | | | | | | | | |
| fine particle-containing cross-linkable polymer 10 | | | | | | | | |
| fine particle-containing cross-linkable polymer 11 | | | | | | | | |
| fine particle-containing cross-linkable polymer 12 | | | | | | | | |
| fine particle-containing cross-linkable polymer 13 | | | | | | | | |
| fine particle-containing cross-linkable polymer 14 | | | | | | | | |
| fine particle-containing cross-linkable polymer 15 | | | | | | | | |
| fine particle-containing cross-linkable polymer 16 | | | | | | | | |

TABLE 1-continued

Table 1-1

|  | Comparative Example | | | | | | | |
|---|---|---|---|---|---|---|---|---|
|  | 1 | 2 | 3 | 4 | 5 | 6 | 7 | 8 |
| cross-linkable polymer 17 fine particle-containing |  |  |  |  |  |  |  |  |
| cross-linkable polymer 18 |  |  |  |  |  |  |  |  |
| cross-linkable polymer 19 |  | 0.2 | 5.0 | 2.0 | 2.0 | 4.0 | 4.0 | 2.0 |
| fine particle 1 |  |  | 15 |  |  |  |  |  |
| diene type polymer (non-fine particle) |  |  |  |  |  |  |  | 3 |
| Zinc oxide | 4 | 4 | 4 | 4 | 4 | 4 | 4 | 4 |
| Stearic acid | 2 | 2 | 2 | 2 | 2 | 2 | 2 | 2 |
| Antiaging agent | 2 | 2 | 2 | 2 | 2 | 2 | 2 | 2 |
| Wax | 2 | 2 | 2 | 2 | 2 | 2 | 2 | 2 |
| Oil | 20 | 20 | 20 | 20 | 20 | 20 | 20 | 20 |
| Sulfur | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 |
| Performance on ice | 100 | 100 | 120 | 92 | 94 | 94 | 95 | 99 |
| Wear resistance | 100 | 100 | 85 | 101 | 72 | 100 | 70 | 100 |

TABLE 2

Table 1-2

|  | Working Examples | | | | | | | | |
|---|---|---|---|---|---|---|---|---|---|
|  | 1 | 2 | 3 | 4 | 5 | 6 | 7 | 8 | 9 |
| NR | 50 | 50 | 50 | 50 | 50 | 50 | 50 | 50 | 50 |
| BR | 50 | 50 | 50 | 50 | 50 | 50 | 50 | 50 | 50 |
| Carbon black | 35 | 35 | 35 | 35 | 35 | 35 | 35 | 35 | 35 |
| Silica | 25 | 25 | 25 | 25 | 25 | 25 | 25 | 25 | 25 |
| Silane coupling agent | 2 | 2 | 2 | 2 | 2 | 2 | 2 | 2 | 2 |
| fine particle-containing cross-linkable polymer 1 (fine particle content) | 6.0 (1.3) |  |  | 15.0 (3.3) |  |  |  |  |  |
| fine particle-containing cross-linkable polymer 2 |  |  |  |  |  |  |  |  |  |
| fine particle-containing cross-linkable polymer 3 |  |  |  |  |  |  |  |  |  |
| fine particle-containing cross-linkable polymer 4 (fine particle content) |  |  |  |  | 15.0 (1.5) |  |  |  |  |
| fine particle-containing cross-linkable polymer 5 (fine particle content) |  |  |  |  |  | 15.0 (1.7) |  |  |  |
| fine particle-containing cross-linkable polymer 6 (fine particle content) |  |  |  |  |  |  | 15.0 (1.8) |  |  |
| fine particle-containing cross-linkable polymer 7 (fine particle content) |  |  |  |  |  |  |  | 15.0 (1.8) |  |
| fine particle-containing cross-linkable polymer 8 (fine particle content) |  |  |  |  |  |  |  |  | 15.0 (1.8) |
| fine particle-containing cross-linkable polymer 9 |  |  |  |  |  |  |  |  |  |
| fine particle-containing cross-linkable polymer 10 |  |  |  |  |  |  |  |  |  |
| fine particle-containing cross-linkable polymer 11 |  |  |  |  |  |  |  |  |  |
| fine particle-containing cross-linkable polymer 12 |  |  |  |  |  |  |  |  |  |
| fine particle-containing cross-linkable polymer 13 |  |  |  |  |  |  |  |  |  |
| fine particle-containing cross-linkable polymer 14 |  |  |  |  |  |  |  |  |  |
| fine particle-containing cross-linkable polymer 15 |  |  |  |  |  |  |  |  |  |
| fine particle-containing cross-linkable polymer 16 |  |  |  |  |  |  |  |  |  |
| fine particle-containing cross-linkable polymer 17 |  |  |  |  |  |  |  |  |  |
| fine particle-containing |  |  |  |  |  |  |  |  |  |

TABLE 2-continued

Table 1-2

| | Working Examples | | | | | | | | |
|---|---|---|---|---|---|---|---|---|---|
| | 1 | 2 | 3 | 4 | 5 | 6 | 7 | 8 | 9 |
| cross-linkable polymer 18 | | | | | | | | | |
| cross-linkable polymer 19 | 4 | 2 | 6 | | | | | | |
| fine particle 1 | | 3 | 9 | | | | | | |
| diene type polymer (non-fine particle) | | | | | | | | | |
| Zinc oxide | 4 | 4 | 4 | 4 | 4 | 4 | 4 | 4 | 4 |
| Stearic acid | 2 | 2 | 2 | 2 | 2 | 2 | 2 | 2 | 2 |
| Antiaging agent | 2 | 2 | 2 | 2 | 2 | 2 | 2 | 2 | 2 |
| Wax | 2 | 2 | 2 | 2 | 2 | 2 | 2 | 2 | 2 |
| Oil | 20 | 20 | 20 | 20 | 20 | 20 | 20 | 20 | 20 |
| Sulfur | 1.5 | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 | 1.5 |
| Performance on ice | 125 | 110 | 115 | 135 | 118 | 121 | 127 | 124 | 116 |
| Wear resistance | 100 | 100 | 100 | 100 | 100 | 100 | 100 | 100 | 100 |

TABLE 3

Table 1-3

| | Working Examples | | | | | | | | | |
|---|---|---|---|---|---|---|---|---|---|---|
| | 10 | 11 | 12 | 13 | 14 | 15 | 16 | 17 | 18 | 19 |
| NR | 50 | 50 | 50 | 50 | 50 | 50 | 50 | 50 | 50 | 50 |
| BR | 50 | 50 | 50 | 50 | 50 | 50 | 50 | 50 | 50 | 50 |
| Carbon black | 35 | 35 | 35 | 35 | 35 | 35 | 35 | 35 | 35 | 35 |
| Silica | 25 | 25 | 25 | 25 | 25 | 25 | 25 | 25 | 25 | 25 |
| Silane coupling agent | 2 | 2 | 2 | 2 | 2 | 2 | 2 | 2 | 2 | 2 |
| fine particle-containing cross-linkable polymer 1 | | | | | | | | | | |
| fine particle-containing cross-linkable polymer 2 | | | | | | | | | | |
| fine particle-containing cross-linkable polymer 3 | | | | | | | | | | |
| fine particle-containing cross-linkable polymer 4 | | | | | | | | | | |
| fine particle-containing cross-linkable polymer 5 | | | | | | | | | | |
| fine particle-containing cross-linkable polymer 6 | | | | | | | | | | |
| fine particle-containing cross-linkable polymer 7 | | | | | | | | | | |
| fine particle-containing cross-linkable polymer 8 | | | | | | | | | | |
| fine particle-containing cross-linkable polymer 9 (fine particle content) | 15.0 (1.8) | | | | | | | | | |
| fine particle-containing cross-linkable polymer 10 (fine particle content) | | 15.0 (2.1) | | | | | | | | |
| fine particle-containing cross-linkable polymer 11 (fine particle content) | | | 15.0 (2.3) | | | | | | | |
| fine particle-containing cross-linkable polymer 12 (fine particle content) | | | | 15.0 (2.3) | | | | | | |
| fine particle-containing cross-linkable polymer 13 (fine particle content) | | | | | 15.0 (1.8) | | | | | |
| fine particle-containing cross-linkable polymer 14 (fine particle content) | | | | | | 15.0 (1.8) | | | | |
| fine particle-containing cross-linkable polymer 15 (fine particle content) | | | | | | | 15.0 (1.1) | | | |
| fine particle-containing cross-linkable polymer 16 (fine particle content) | | | | | | | | 15.0 (1.1) | | |
| fine particle-containing cross-linkable polymer 17 (fine particle content) | | | | | | | | | 15.0 (3.0) | |

TABLE 3-continued

Table 1-3

| | \multicolumn{10}{c}{Working Examples} | | | | | | | | | |
|---|---|---|---|---|---|---|---|---|---|---|
| | 10 | 11 | 12 | 13 | 14 | 15 | 16 | 17 | 18 | 19 |
| fine particle-containing cross-linkable polymer 18 (fine particle content) | | | | | | | | | 15.0 (3.0) | |
| cross-linkable polymer 19 | | | | | | | | | | |
| fine particle 1 | | | | | | | | | | |
| diene type polymer (non-fine particle) | | | | | | | | | | |
| Zinc oxide | 4 | 4 | 4 | 4 | 4 | 4 | 4 | 4 | 4 | 4 |
| Stearic acid | 2 | 2 | 2 | 2 | 2 | 2 | 2 | 2 | 2 | 2 |
| Antiaging agent | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Oil | 20 | 20 | 20 | 20 | 20 | 20 | 20 | 20 | 20 | 20 |
| Sulfur | 1.5 | 1.5 | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 | 1.5 | 1.5 |
| Performance on ice | 123 | 126 | 120 | 118 | 122 | 123 | 114 | 113 | 135 | 128 |
| Wear resistance | 100 | 100 | 100 | 100 | 100 | 100 | 100 | 100 | 100 | 100 |

The components shown in Table 1 are as follows.

NR: Natural rubber (STR 20, glass transition temperature=−65° C., produced by Von Bundit Chumphon Co., Ltd.)

BR: Polybutadiene rubber (Nipol BR 1220, glass transition temperature=−110° C., manufactured by Nippon Zeon Co., Ltd.)

Carbon black: SHOBLACK N339 (produced by Cabot Japan Co., Ltd.)

Silica: ULTRASIL VN3 (produced by Evonik-Degussa)

Silane coupling agent: Silane coupling agent (Si 69, produced by Evonik-Degussa)

Fine particle-containing cross-linkable polymers 1 to 18: Polymers produced by the aforementioned methods.

Cross-Linkable polymer 19: Hydrolyzable silyl group-terminated polyoxypropylene glycol (MS Polymer S 810, produced by Kaneka Corp.)

Fine particle 1: Fine particle produced in the aforementioned manner.

Diene type polymer (non-fine particle): Liquid polyisoprene rubber (Kuraprene LIR-30, number average molecular weight=28,000, produced by Kuraray Co., Ltd.)

Zinc oxide: Zinc oxide type 3 (Seido Chemical Co., Ltd.)

Stearic acid: Stearic acid beads YR (NOF Corporation)

Antiaging agent: Amine type antiaging agent (SANTOFLEX 6PPD, produced by Flexis AG)

Wax: Paraffin wax (produced by Ouchi Shinko Chemical Co., Ltd.)

Oil: Aromatic oil (Extract no. 4S, produced by Showa Shell Sekiyu Co., Ltd.)

Sulfur: 5% oil-treated sulfur (produced by Hosoi Chemical Co., Ltd.)

Vulcanization accelerator: Sulfenamide type vulcanization accelerator (SANCELER CM-G, produced by Sanshin Chemical Industry Co., Ltd.)

As understood from the results shown in Table 1, the Comparative Example 2 having a low blended amount of the fine particles (D) was found to have about the same performance on ice and wear resistance as those of Comparative Example 1, which had been prepared without blending of fine particles.

Moreover, Comparative Example 3 (having a large blended amount of the fine particles (D)) is understood to have had inferior wear resistance, although performance on ice improved, in comparison to Comparative Example 1, which had been prepared without blending of fine particles.

Moreover, Comparative Examples 4 and 6 (having blended fine particles of small diameter) are understood to have lower performance on ice than that of Comparative Example 1.

Further, Comparative Examples 5 and 7 (having blended fine particles of large diameter) are understood to have lower wear resistance and performance on ice than those of Comparative Example 1.

Further, Comparative Example 8 (having blended diene type polymer without forming of fine particles) is understood to have performance on ice and wear resistance similar to those of Comparative Example 1.

In contrast, Working examples 1 to 19 (having certain blended amounts of the cross-linkable oligomer or polymer (C) and the fine particles (D)) all maintained excellent wear resistance similar to that of the Comparative Example 1, and performance on ice is understood to have improved.

Here, in the results of Working Examples 1 to 4, Working Examples 1 and 4 (wherein the fine particles (D) were generated beforehand in the cross-linkable oligomer or polymer (C)) are understood to have had better performance on ice.

Moreover, in the results of Working Examples 1 to 4, examples having a high content of the fine particles (D) are understood to have further improved performance on ice.

REFERENCE NUMERALS

1 Bead portion
2 Side wall portion
3 Tire tread portion
4 Carcass layer
5 Bead core
6 Bead filler
7 Belt layer
8 Rim cushion

What is claimed is:

1. A tire rubber composition comprising:
   100 parts by mass of a diene type rubber (A);
   from 30 to 100 parts by mass of a carbon black and/or a white filler (B);

from 0.3 to 30 parts by mass of a cross-linkable oligorteroligomer or polymer (C) that is not phase-soluble with the diene type rubber(A); and from 0.1 to 12 parts by mass of three dimensionally crosslinked fine particles (D) of 1 to 200 μm average particle diameter, wherein the cross-linkable oligomer or polymer (C) is selected from the group consisting of polyether-based, polyester-based, polyolefin-based, polycarbonate-based, aliphatic-based, saturated hydrocarbon-based, acrylic-based, and plant-derived polymers and copolymers, and has at least one or more reactive functional group selected from the group consisting of silane functional group, (meth)acryloyl group, allyl group, carboxy group, acid anhydride group, and epoxy group;

wherein the fine particles (D) are three-dimensionally crosslinked form of an oligomer or polymer (d1) that is not phase-soluble with the cross-linkable oligomer or polymer (C) and is selected from the group consisting of polyoxypropylene glycol, polycarbonate-based, aliphatic-based, saturated hydrocarbon-based, acrylic-based, and plant-derived polymers and copolymers;

and the oligomer or polymer (d1) has at least one or more reactive functional group that is different from and unreactive with the reactive functional group of the cross-linkable oligomer or polymer (C) and is selected from the group consisting of hydroxyl group, silane functional group, isocyanate group, (meth)acryloyl group, allyl group, carboxy group, acid anhydride group, and epoxy group.

2. The tire rubber composition of claim 1;
wherein the diene type rubber (A) comprises at least 30% by weight of at least one type of rubber selected from the group consisting of natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and derivatives of such rubbers.

3. The tire rubber composition of claim 1;
wherein the cross-linkable oligomer or polymer (C) is selected from the group consisting of polyether-based, polyester-based, polyolefin-based, polycarbonate-based, acrylic-based, and plant derived polymers and copolymers; and the oligomer or polymer (d1) is selected from the group consisting of aliphatic-based polymers and copolymers.

4. The tire rubber composition of claim 1;
wherein the fine particles (D) are fine three dimensionally crosslinked particles of the reaction product of the oligomer or polymer (d1) and at least one component (d2) selected from the group consisting of water, a catalyst, and a compound having a functional group reactive with the reactive functional group of (d1).

5. The tire rubber composition of claim 4;
wherein, among the components (d2), the compound having a functional group reactive with the reactive functional group is at least one compound selected from the group consisting of hydroxyl group-containing compounds, silanol compounds, hydrosilane compounds, diisocyanate compounds, amine compounds, oxazolidine compounds, enamine compounds, and ketimine compounds.

6. The tire rubber composition of claim 1;
wherein an average particle diameter of the fine particles (D) is 1 to 50 μm.

7. The tire rubber composition of claim 1;
wherein an average glass transition temperature of the diene type rubber (A) is −50° C. or less.

8. A studless tire comprising the tire rubber composition described in claim 1 for the tire tread.

* * * * *